April 12, 1955  G. VENNERHOLM  2,705,822
MOLDING PROCEDURE
Filed June 2, 1951

G. VENNERHOLM
INVENTOR.

BY
ATTORNEYS

United States Patent Office 2,705,822
Patented Apr. 12, 1955

2,705,822

MOLDING PROCEDURE

Gosta Vennerholm, Dearborn, Mich., assignor to Ford Motor Company, Dearborn, Mich., a corporation of Delaware Application June 2, 1951, Serial No. 229,595

3 Claims. (Cl. 22—193)

This invention is concerned with the metal founding art and more specifically with a process for the preparation of molds for the reception of molten metal.

In recent years the preparation of foundry molds from resin bonded sand has increased decidedly in importance. The impetus for this increase may be found largely in the introduction of the so-called shell molding technique in which a thin and highly permeable mold is prepared from ordinary foundry sand bonded with from three to ten per cent of a phenol aldehyde type resin.

As presently practised, this process requires the use of a metal pattern, since in use the pattern must be heated to a temperature in the neighborhood of 350° Fahrenheit. To prepare a mold, the metal pattern is heated to the requisite temperature and showered with an intimate mixture of sand having a fineness corresponding to A. F. A. No. 90, mixed with about seven per cent of an uncured or partially cured, phenol aldehyde resin. When this resin sand mixture contacts the heated pattern, the resin immediately adjacent the heated pattern proceeds to cure and acquire physical strength. This curing is permitted to take place until a shell about one-eighth to one-quarter of an inch thick has been obtained, at which time the excess loose, unbonded sand and resin is removed from the pattern. The cure of this shell is usually completed on the pattern and in an oven heated to about 650° Fahrenheit. This entire cycle can be compressed into a time cycle of the order of one or two minutes.

This process is capable of producing casting having very fine finishes and very close dimensional tolerances. However, due to the necessity of employing pulverulent sand resin mixtures, the process has been difficult to mechanize and presents the usual health hazards encountered with the dusting of sharp silica sand. In an effort to develop a process more amenable to automation and less troublesome in practice, the instant invention has been developed.

This invention is probably best understood from a study of the following drawings in which.

In the practice of this invention, advantage is taken of the fact that, under certain circumstances, it is possible to produce the resin sand mixture in a plastic sheet or blanket form. This plastic sheet or blanket may be obtained at room temperatures by the use of resins in an early stage of cure in which they are still syrupy liquids or in which, if solid, they are soluble in suitable solvents to produce a highly viscous solution. This blanket may be attained temporarily at elevated temperatures by taking advantage of the fact that the thermo-setting phenol aldehyde resins pass through a transient thermoplastic stage. In either event, the pug-like mixture of sand and resin can be formed into a blanket either by extrusion or rolling. The rolling procedure is particularly useful where it is desired to produce a heated blanket, inasmuch as the roll can readily be heated for this purpose.

Figure 2:
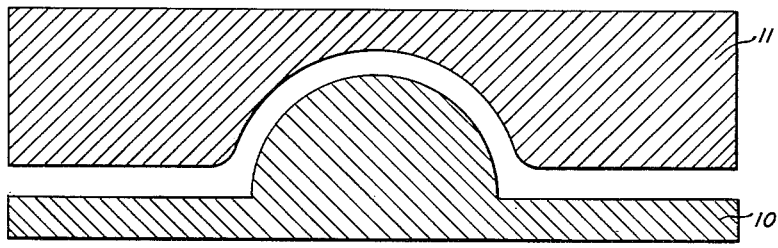
Figure 2 is a section of the male and female pattern employed in this process.

For the production of a mold by this process, it is necessary that male mold 10 and female mold 11 be employed and that at least one of these molds be capable of being heated and of being moved into a cooperating position. In Figure 2 the male mold is indicated at 10 and the female mold at 11.

Figure 3:
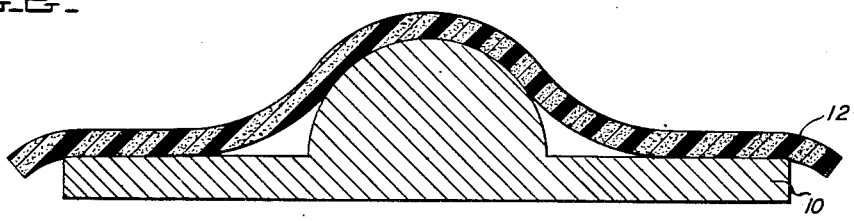
Figure 3 is a section of the male mold with the mold forming material in place.
Figure 4:
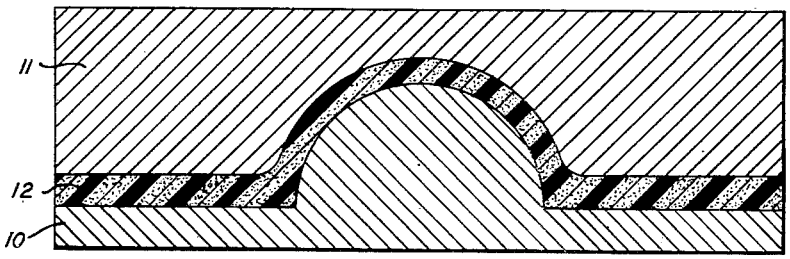
Figure 4 is a section showing the male and female mold members and the mold forming material in another position.

In Figure 3 the male mold 10 is shown with a blanket 12 of thermoplastic sand resin mixture draped thereover. Female mold 11 has been omitted from Figure 3. In Figure 4, the female mold 11 has been brought down into proximity with male mold 10 and the pair serve to shape the sand resin blanket 12 to precisely the desired configuration. The sand resin blanket 12 is permitted to remain between heated molds 10 and 11 until the desired cure has been imparted to the partially cured phenol aldehyde resin which has been admixed with the stand. The length of time required for this process will be in the neighborhood of one minute, if the molds are heated to 350° Fahrenheit, the ordinary triethanolamine catalyst is used. It will be apparent to those skilled in the art that, with other catalysts or other mold temperatures, the curing period will be varied to produce the desired results. When the cure has been completed, the formed mold is removed from the mold and is ready for use.

Figure 1:
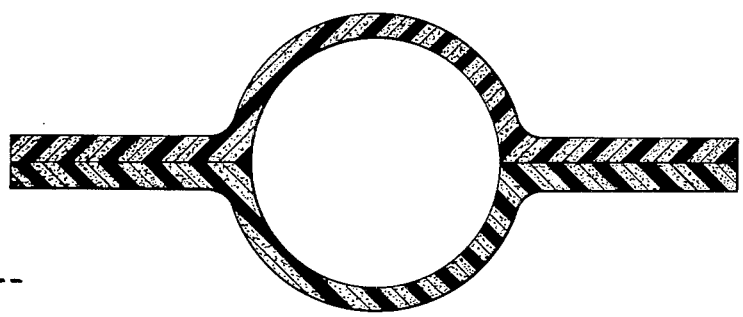
Figure 1 is a sectional view of a complete mold produced by this practice.

Figure 1 is a cross section of a completed mold fabricated from two shells produced from the apparatus shown in Figures 2, 3 and 4 and secured together by clips, bolting, or otherwise which have not been shown.

This invention has been partly described with reference to a phenol aldehyde type of resin and with ordinary silica sand as the refractory. However it is to be understood that any suitable resin, either thermoplastic or thermosetting, may be used. Similarly, any suitable pulverulent refractory may be substituted for silica sand.

By the use of this invention, it is possible to accurately form the exterior of the molds as well as the interior of the molds. With an accurately formed exterior on the shell molds, it is possible to dispense with the necessity of shot backing for these molds during the casting operation, since these molds have definite predetermined exterior shape, they can be backed by permanent supporting members independent of any shot.

This invention has been particularly described in connection with a plastic sand resin blanket or sheet. However, this particular form of the sand resin is by no means essential to the invention. The sand resin mixture may be deposited between the opened dies in a mass of any convenient shape and the dies then closed to force the sand resin mixture to assume the desired shape. Alternatively the dies may be closed before the sand resin mixture is introduced. The sand resin mixture may then be injected into the heated dies much as plastics are ordinarily injection molded.

I claim as my invention:

1. The process for producing a mold for the reception of molten metal comprising preparing a mixture of a thermo-setting resin and sand, heating this mixture to a temperature sufficient to impart to it a temporary plasticity, forming the plastic mixture into a sheet, shaping this sheet to the desired mold shape between dies and heating the plastic sheet between the dies until the plastic sheet further cures and develops mechanical strength.

2. The process for producing a mold for the reception of molten metal comprising preparing a mixture of a thermo-setting resin and sand, rolling this mixture into a sheet on rolls heated sufficiently to impart to the mixture a temporary plasticity, shaping this sheet to the desired mold shape between dies and heating the plastic sheet between the dies until the plastic sheet further cures and develops mechanical strength.

3. The process of producing a mold for the reception of molten metal comprising preparing a mixture of sand and an incompletely cured thermosetting resin, said resin being present in sufficient quantity to render the mixture plastic, preparing a plastic sheet from said mixture, shaping the plastic sheet over a die and heating the plastic sheet on the die until the sheet develops mechanical strength.

(References on following page)

References Cited in the file of this patent

UNITED STATES PATENTS

| | | |
|---|---|---|
| 814,209 | Holstein | Mar. 6, 1906 |
| 1,467,112 | Lucier | Sept. 4, 1923 |
| 2,024,092 | Cox | Dec. 10, 1935 |
| 2,056,415 | Young | Oct. 6, 1936 |
| 2,510,840 | Stowe | June 6, 1950 |

FOREIGN PATENTS

| | | |
|---|---|---|
| 900,521 | France | Oct. 9, 1944 |

OTHER REFERENCES

FIAT Final Report No. 1168, The "C" Process of Making Molds and Cores for Foundry Use, by McCulloch. Published May 30, 1947. Pages 1, 2 and 3.